(12) United States Patent
Tsukada et al.

(10) Patent No.: US 10,049,824 B2
(45) Date of Patent: Aug. 14, 2018

(54) ACTIVATED CARBON FOR ELECTRODE OF POWER STORAGE DEVICE AND METHOD FOR MANUFACTURING ACTIVATED CARBON FOR ELECTRODE OF POWER STORAGE DEVICE

(71) Applicants: AION CO., LTD., Osaka (JP); NATIONAL UNIVERSITY CORPORATION GUNMA UNIVERSITY, Gunma (JP)

(72) Inventors: Hidehiko Tsukada, Gunma (JP); Kimiyasu Onda, Kanagawa (JP); Hiroshi Miyaji, Tokyo (JP); Soshi Shiraishi, Gunma (JP); Yukiko Endo, Gunma (JP)

(73) Assignees: AION CO., LTD, Osaka (JP); NATIONAL UNIVERSITY CORPORATION GUNMA UNIVERSITY, Gunma (JP)

(*) Notice: Subject to any disclaimer, the term of this patent is extended or adjusted under 35 U.S.C. 154(b) by 364 days.

(21) Appl. No.: 14/384,279

(22) PCT Filed: Feb. 22, 2013

(86) PCT No.: PCT/JP2013/054497
§ 371 (c)(1),
(2) Date: Sep. 10, 2014

(87) PCT Pub. No.: WO2013/140937
PCT Pub. Date: Sep. 26, 2013

(65) Prior Publication Data
US 2015/0049415 A1   Feb. 19, 2015

(30) Foreign Application Priority Data

Mar. 23, 2012 (JP) ................. 2012-067000

(51) Int. Cl.
*H01G 9/00* (2006.01)
*H01G 9/04* (2006.01)
(Continued)

(52) U.S. Cl.
CPC .......... *H01G 11/34* (2013.01); *C01B 32/336* (2017.08); *H01G 11/06* (2013.01); *H01G 11/24* (2013.01); *Y02E 60/13* (2013.01)

(58) Field of Classification Search
CPC ........ H01G 11/06; H01G 11/34; H01G 9/048; H01G 9/0425; H01G 9/155; Y02E 60/13
(Continued)

(56) References Cited

FOREIGN PATENT DOCUMENTS

| JP | 60-149115 A | 8/1985 |
|---|---|---|
| JP | S64-46913 A | 2/1989 |

(Continued)

OTHER PUBLICATIONS

Fuji Techno System Co., Ltd., "2nd Impression", Porous Adsorbent Handbook; Aug. 24, 2005, p. 444.
(Continued)

*Primary Examiner* — Eric Thomas
*Assistant Examiner* — Arun Ramaswamy
(74) *Attorney, Agent, or Firm* — Greenblum & Bernstein, P.L.C.

(57) ABSTRACT

An activated carbon for an electrode of a power storage device of the present invention has uniform consecutive macropores, and a pore size distribution centered within a range of 1.5 to 25 μm, a specific surface area within a range of 1,500 to 2,300 $m^2/g$, a micropore volume within a range of 0.4 to 1.0 mL/g, and an average micropore width within a range of 0.7 to 1.2 nm. Provided is an activated carbon for an electrode of a power storage device suitable for an electric double layer capacitor that has high capacitance during charging and discharging at high current density and (Continued)

excellent endurance against charging at a high voltage of 3 V or more and a lithium-ion capacitor having excellent endurance against charging at a high voltage of 4 V or more.

7 Claims, 18 Drawing Sheets

(51) Int. Cl.
    *H01G 9/145*     (2006.01)
    *C01B 31/00*     (2006.01)
    *H01G 11/34*     (2013.01)
    *H01G 11/06*     (2013.01)
    *H01G 11/86*     (2013.01)
    *H01G 11/24*     (2013.01)
    *C01B 32/336*     (2017.01)

(58) Field of Classification Search
    USPC ............... 361/502, 503, 508, 516; 264/29.6
    See application file for complete search history.

(56) References Cited

FOREIGN PATENT DOCUMENTS

| | | | |
|---|---|---|---|
| JP | 05-217803 A | 8/1993 | |
| JP | 8-151474 A | 6/1996 | |
| JP | 2005-187320 A | 7/2005 | |
| JP | 2010267878 A | * 11/2010 | ............ H01G 11/06 |

OTHER PUBLICATIONS

"Production of Carbon Porous Material Using Porous Polyacrylonitrile as Precursor and Application to Electrode.", "Proceedings of the 2011 Annual Meeting of the Carbon Society of Japan", p. 44.

Techno System Co., Ltd., "1st Impression of 1st ed.", Application Technique of Activated Carbon; Table 2.3.5, Jul. 25, 2000, p. 81.

IPRP issued with respect to application No. PCT/JP2013/054497, mail date is May 21, 2013.

International Search report issued with respect to Application No. PCT/JP2013/054497, mail date is May 21, 2013.

International Preliminary Report on Patentability issued with respect to application No. PCT/JP2013/054497, mail date is Oct. 2, 2014.

Korean Notification of Preliminary Rejection in respect to Korean Application No. 10-2014-7014649, dated Oct. 12, 2015, with English Translation.

Korean Notification of Final Rejection in respect to Korean Application No. 10-2014-7014649, dated Apr. 27, 2016, with English Translation.

Korean Notification of Final Rejection (Re-examination) in respect to Korean Application No. 10-2014-7014649, dated Aug. 16, 2016, with English Translation.

Korean Notification of Preliminary Rejection in respect to Korean Application No. 10-2016-7031729, dated Feb. 7, 2017, with English Translation.

Japanese Office Action issued in respect to Japanese Application No. 2012-067000, dated Apr. 12, 2016, with English translation.

* cited by examiner (a)

(b)

EXAMPLE 1 (MACROPORE 7 MICROMETER)

(a)

(b)

EXAMPLE 3 (MACROPORE 8 MICROMETER)

(a)

(b)

EXAMPLE 4 (MACROPORE 27 MICROMETER)

(a)

(b)

COMPARATIVE EXAMPLE 3

MEASUREMENT RESULT OF PORE SIZE
DISTRIBUTION (USE OF POROSIMETER)

ACTIVATED CARBON FOR ELECTRODE OF POWER STORAGE DEVICE AND METHOD FOR MANUFACTURING ACTIVATED CARBON FOR ELECTRODE OF POWER STORAGE DEVICE

TECHNICAL FIELD

The present invention relates to an activated carbon used for an electrode of a power storage device including an electric double layer capacitor and a lithium-ion capacitor, and a method for manufacturing an activated carbon used for an electrode of a power storage device.

BACKGROUND ART

An electric double layer capacitor that can be repeatedly used by charging is a capacitor in which a charge is stored in an ion adsorption layer that is formed in pores of a porous carbon electrode, such as an activated carbon, that is, an electric double layer. Since this electric double layer capacitor has a long lifetime and high output, it has been used as a power source for backing up of computer memory. Recently, attention has been rapidly paid to the electric double layer capacitor as an electric power storage system mounted on a railway vehicle and an auxiliary power source for a hybrid vehicle.

In recent years, in order to improve the energy density of the electric double layer capacitor, hybrid capacitors in which an activated carbon electrode and an active material for a rechargeable battery are used for an electrode material have been developed. A lithium-ion capacitor is one of the hybrid capacitors. In this lithium-ion capacitor, an activated carbon, a carbon material for a lithium-ion battery negative electrode, and an organic electrolyte solution for a lithium-ion battery are used for a positive electrode, a negative electrode, and an electrolyte solution, respectively.

As shown in FIG. 17, a power source 14 is connected between two activated carbon electrodes 12 and 13 that are immersed in an electrolyte solution 11 and an electric double layer capacitor 10 is charged by application of voltage. During charging, electrolyte ions are adsorbed on surfaces of the electrodes. Specifically, anions (−) in the electrolyte solution 11 and cations (+) in the electrolyte solution 11 are attracted to holes ($h^+$) in the positive electrode 12 and electrons ($e^-$) in the negative electrode 13, respectively, and the holes ($h^+$) and the anions (−) and the electrons ($e^-$) and the cations (+) are arranged at a minimum distance of several angstroms to form an electric double layer. This state is maintained even when the power source is taken off. A power storage state is maintained without use of a chemical reaction. During discharging, the adsorbed cations and anions are each detached from the electrodes. Specifically, the electrons ($e^-$) return to the positive electrode 12, resulting in a decrease in the holes ($h^+$). As a result, the anions and the cations are diffused in the electrolyte solution again. Thus, materials for the capacitor are not changed over the whole process of charging and discharging. Therefore, a long lifetime can be kept without generation of heat and degradation due to a chemical reaction.

The electric double layer capacitor is characterized in that (1) charging and discharging can be carried out at high rate, (2) the reversibility of charge and discharge cycle is high, (3) the cycle life is long, and (4) it is environmentally friend since heavy metal is not used for an electrode and an electrolyte. This is because heavy metal is not used for the electric double layer capacitor, and the electric double layer capacitor is operated by physical absorption and detachment of ions and an electron transfer reaction of chemical species is not caused.

Since energy (E) stored in the electric double layer capacitor is proportional to a product of a square of charging voltage (V) and an electric double layer capacitance (C) ($E=CV^2/2$), an increase in the capacitance and the charging voltage is effective for the improvement of an energy density. The charging voltage of the electric double layer capacitor is usually suppressed to about 2.5 V. A reason for this is described as follows. When the electric double layer capacitor is charged at a voltage of 3 V or more, electrolysis of the electrode and the electrolyte solution starts, and as a result, the capacitance decreases and the electric double layer capacitor is deteriorated.

At present, as shown in FIG. 18, a practical activated carbon for an electrode of an electric double layer capacitor is manufactured by adding an appropriate amount of conductive auxiliary agent such as carbon black to activated carbon particles having a size of 1 to 10 μm, molding the mixture using a fibrillated binder such as a polytetrafluoroethylene-based material into a sheet. It may be considered that not only the activated carbon and the electrolytic solution, but also the binder and the conductive auxiliary agent that configures the activated carbon for an electrode affect the decrease in the capacitance due to charging of this electric double layer capacitor at a voltage of 3 V or more.

In order to further increase the capacitance of the electric double layer capacitor, which is not the purpose of solving the decrease in the capacitance, an activated carbon for an electrode that does not contain a binder and a conductive material, that is, a seamless (without a seam) activated carbon for an electrode in which a contact interface is not present between activated carbon particles has been proposed up to now (for example, see Non-Patent Document 1). In Non-Patent Document 1, an activated carbon for an electrode is directly manufactured using a feature of a sol-gel method that is excellent in moldability without use of a binder. When the capacitance of an electrode (binder-free electrode) using the activated carbon that is manufactured without use of a binder is higher than that of an electrode using an activated carbon that is manufactured using a binder and the thickness of the activated carbon for an electrode is large, it is confirmed that differences thereof are remarkable.

As a material concerning another seamless activated carbon for an electrode, a carbon material that has a fine porous structure produced by firing a polyacrylonitrile-based polymer (PAN) porous material and a specific surface area of about 1,000 $m^2/g$ has been disclosed (for example, see Non-Patent Document 2). The activated carbon for an electrode shown in Non-Patent Document 2 is manufactured by dissolving PAN in a mixed solvent of dimethyl sulfoxide and water under heating with stirring, and heating a cooled molded body at 230° C. for 1 hour in air, followed by heating at 900° C. for 2 hours in a carbon dioxide/argon atmosphere.

As another manufacturing method, a method for molding a tablet-shaped carbon material without a binder has been disclosed (for example, see Patent Document 1). In Patent Document 1, a phenol compound reacts an aldehyde compound in the presence of water and a catalyst in a disc-shaped container to obtain a tablet-shaped wet gel, water in the wet gel is substituted with a hydrophilic organic solvent and freeze-dried to obtain a tablet-shaped dry gel, and the tablet-shaped dry gel is fired in an inert atmosphere to produce a tablet-shaped carbon material. The tablet-shaped carbon material molded without a binder by this method has a microstructure such as micropores that are fine pores with a diameter of less than 2 nm and mesopores (fine pores with a diameter of 2 to 50 nm).

Further, a block of a carbonized resin porous material that has continuous pores inside and is activated has been disclosed (for example, see Patent Document 2). Herein, an activated carbon block obtained by carbonization of a phenolic resin molded body followed by activation is shown as a preferable example.

PRIOR ART REFERENCES

Patent Documents

Patent Document 1: Japanese Patent Application Laid-Open No. 2005-187320 (Abstract and paragraph [0014])
Patent Document 2: Japanese Patent Application Laid-Open No. 05-217803 (paragraphs [0015] and [0049]) Non-Patent Documents
Non-Patent Document 1: Porous Adsorbent Handbook, p. 444, Aug. 24, 2005, 2nd impression, published by Fuji Techno System Co., Ltd.
Non-Patent Document 2: Proceedings of the 2011 Annual Meeting of The Carbon Society of Japan, p. 44, "Production of Carbon Porous Material Using Porous Polyacrylonitrile as Precursor and Application to Electrode"
Non-Patent Document 3: Application Technique of Activated Carbon, p. 81, Table 2.3.5, 1st impression of 1st ed., Jul. 25, 2000, published by Technosystem Co., Ltd.

SUMMARY OF THE INVENTION

Problems to be Solved by the Invention

However, a fibrous activated carbon using polyacrylonitrile as a base, as disclosed in Non-Patent Document 3, is marketed, but is not used for a capacitor. A reason for this is estimated as follows. Even when a carbonized material of polyacrylonitrile is sufficiently subjected to an activation treatment, the specific surface area does not readily reach 1,500 $m^2$/g or more, and a substantial capacitance cannot be attained. This is because Non-Patent Document 3 has disclosed that the specific surface area of polyacrylonitrile-based fibrous activated carbon is 1,250 $m^2$/g or less.

In the carbon porous material of Non-Patent Document 2, a specific surface area of about 1,000 $m^2$/g is only obtained. It is estimated that the capacitance is not sufficient for an electric double layer capacitor. In Non-patent Document 2, polyacrylonitrile is used. Therefore, even when an activation treatment is carried out under a severe condition, as shown in Non-Patent Document 3, the specific surface area may not be sufficiently large. Accordingly, the carbon porous material of Non-Patent Document 2 may have a structure close to a seamless activated carbon, but is not expected as an electrode material for a capacitor using an organic electrolyte solution.

When a carbon material having a thickness of several hundreds atm or more is subjected to an activation treatment, macropores that are fine pores with a diameter of more than 50 nm are required to pass an activated gas and an activation reagent to the inside of the carbon material. In order to impregnate the inside of an activated carbon electrode having a thickness of several hundreds μm or more with an electrolyte solution for an electric double layer capacitor or a lithium-ion capacitor, macropores are effective. However, the tablet-shaped carbon manufactured by the methods of Patent Document 1 and Non-Patent Document 1 has only a microstructure such as micropores and mesopores and does not have macropores. For this reason, activation may not be sufficiently achieved, and there are troubles in which impregnation with the electrolyte solution is not sufficient and the capacitance decreases.

Further, when it is assumed that volume is not shrunk by activation from judgment in terms of density, the activation yields of Reference Examples 1 and 2 in Patent Document 2 are estimated to be 81% and 74%, respectively. In the case of the activation yields, the specific surface area is about 1,000 to about 1,200 $m^2$/g. Therefore, it is considered that in the capacitor using an organic electrolyte solution, sufficient capacitance and endurance are not attained. From a photomicrograph, it is presumed that the pore sizes of macropores in Examples 1 and 2 in Patent Document 2 are as ununiform as about 50 μm. When such pore sizes are large, the thickness of wall of carbon matrix to be activated also reaches several tens μm. Therefore, even the inside of the electrode may not be uniformly activated. Further, when the macropores are ununiform, the thickness of the carbon matrix is ununiform. Therefore, the degree of activation varies in micros. Accordingly, it may be necessary that consecutive macropores be uniform and have a pore size equal to or less than a certain pore size.

It is an object of the present invention to provide an activated carbon for an electrode of a power storage device suitable for an electric double layer capacitor that has high capacitance during charging and discharging at high current density (2,000 mA/g) and excellent endurance against charging at a high voltage of 3 V or more and a lithium-ion capacitor having excellent endurance against charging at a high voltage of 4 V or more, and a method for manufacturing the activated carbon for an electrode of a power storage device.

Means for Solving the Problems

A first aspect of the present invention is an activated carbon for an electrode of a power storage device that has uniform consecutive macropores, a pore size distribution centered within a range of 1.5 to 25 μm, a specific surface area within a range of 1,500 to 2,300 $m^2$/g, a micropore volume within a range of 0.4 to 1.0 mL/g, and an average micropore width within a range of 0.7 to 1.2 nm.

A second aspect of the present invention is a method for manufacturing an activated carbon for an electrode of a power storage device including a step of adding and mixing a pore forming agent and a cross-linker in an aqueous solution prepared by mixing a phenolic resin and polyvinyl alcohol, adding and mixing a catalyst for curing this mixed solution in the mixed solution, adding and mixing water in the mixture to obtain a reaction solution, injecting the reaction solution into a block-shaped mold made of a synthetic resin, heating the reaction solution to cause a reaction for a predetermined time, taking the resulting reaction product from the mold, washing the reaction product with water to remove the pore forming agent and the unreacted substance, drying the reaction product, to obtain a block of porous phenolic resin in which uniform consecutive macropores with an average pore size within a range of 3 to 35 μm are formed in a three-dimensional network form, a step of cutting the block into a plate shape, heating the cut plate-shaped body in an inert gas atmosphere from room temperature to a range of 700 to 1,000° C., and holding the plate-shaped body in the inert gas atmosphere at the increased temperature, resulting in a carbonization treatment, to obtain a plate-shaped carbonized material, and a step of carrying out an activation treatment of the plate-shaped carbonized material so that the activation yield falls within a range of 40 to 70%, to obtain a plate-shaped activated carbon.

A third aspect of the present invention is the method for manufacturing an activated carbon for an electrode of a power storage device according to the second aspect, wherein the activation treatment is carried out by heating the plate-shaped carbonized material in an inert gas atmosphere from room temperature to a range of 800 to 900° C., and holding the material under passing of carbon dioxide at the increased temperature.

A fourth aspect of the present invention is an electric double layer capacitor using the activated carbon according to the first aspect for an electrode.

A fifth aspect of the present invention is a lithium-ion capacitor using the activated carbon according to the first aspect for an electrode.

A sixth aspect of the present invention is an electric double layer capacitor using an activated carbon manufactured by the method according to the second aspect for an electrode.

A seventh aspect of the present invention is a lithium-ion capacitor using an activated carbon manufactured by the method according to the second aspect for an electrode.

Effects of the Invention

The activated carbon for an electrode of a power storage device according to the first aspect of the present invention has uniform consecutive macropores, a pore size distribution centered within a range of 1.5 to 25 µm, a specific surface area within a range of 1,500 to 2,300 m²/g, a micropore volume within a range of 0.4 to 1.0 mL/g, and an average micropore width within a range of 0.7 to 1.2 nm. Therefore, an activated carbon for an electrode of a power storage device suitable for an electric double layer capacitor that has high capacitance during charging and discharging at high current density (2,000 mA/g) and excellent endurance against charging at a high voltage of 3 V or more and a lithium-ion capacitor having excellent endurance against charging at a high voltage of 4 V or more is obtained.

In the method according to the second aspect of the present invention, a porous phenolic resin in which uniform consecutive macropores with an average pore size within a range of 3 to 35 µm are formed in a three-dimensional network form is subjected to a carbonization treatment, followed by an activation treatment. As a result, activation of a carbonized material is sufficiently achieved. Further, a binder and a conductive auxiliary agent are not contained and a contact interface is not present between activated carbon particles. Therefore, an activated carbon for an electrode of a power storage device suitable for an electric double layer capacitor that has high capacitance during charging and discharging at high current density (2,000 mA/g) and excellent endurance against charging at a high voltage of 3 V or more and a lithium-ion capacitor having excellent endurance against charging at a high voltage of 4 V or more is obtained.

EMBODIMENTS OF THE INVENTION

Hereinafter, embodiments for carrying out the present invention will be described on the basis of the drawings.

Figure 1:
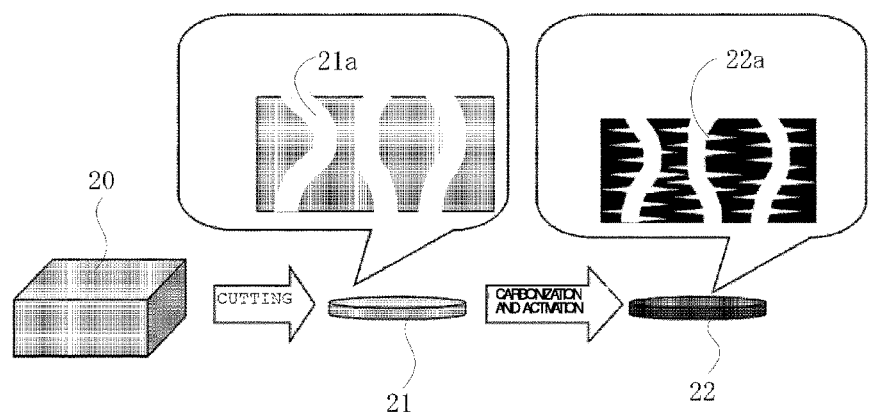
FIG. 1 is a view illustrating a method for manufacturing an activated carbon for an electrode of a power storage device of the present invention.
Figure 2:
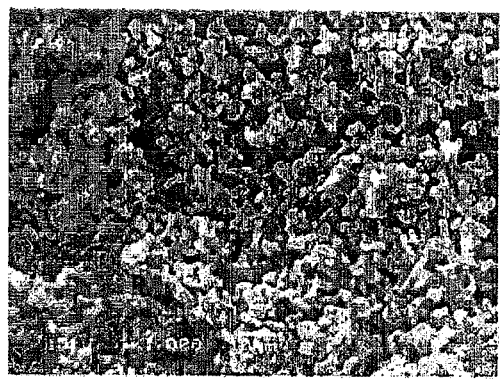
FIG. 2 is a view showing a scanning electron micrograph of surface of an activated carbon in Example.
Figure 2:
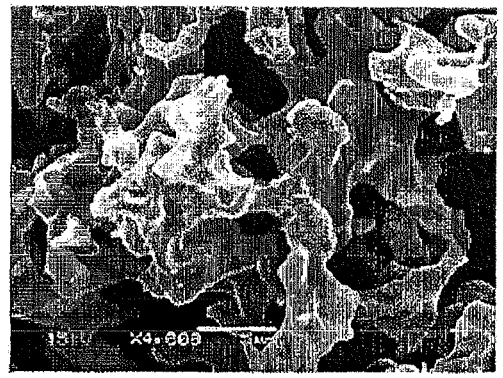
Figure 3:
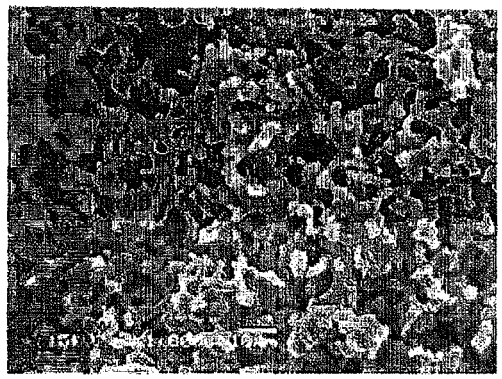
FIG. 3 is a view showing a scanning electron micrograph of surface of an activated carbon in Example.
Figure 3:
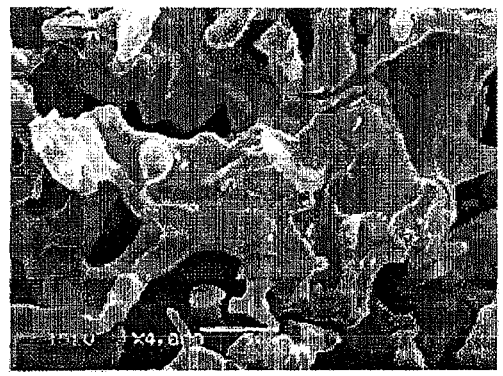
Figure 4:
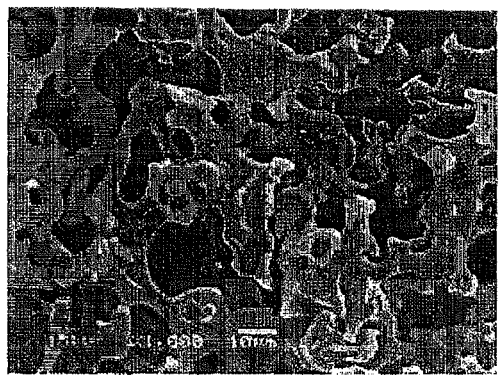
FIG. 4 is a view showing a scanning electron micrograph of surface of an activated carbon in Example.
Figure 4:
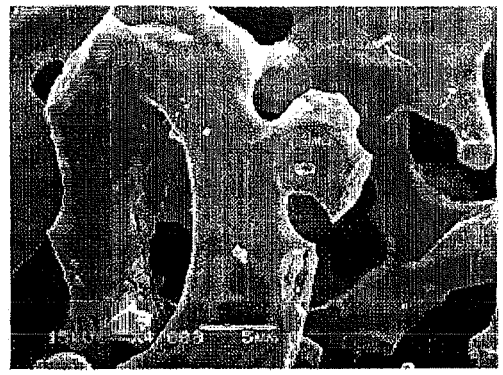
Figure 5:
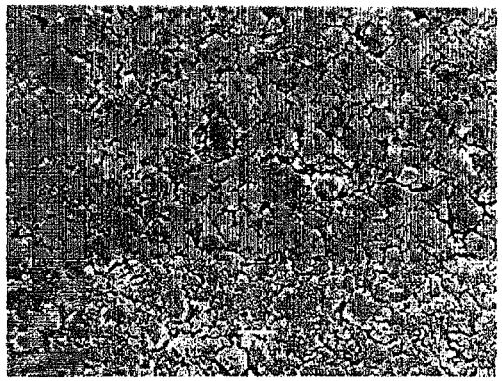
FIG. 5 is a view showing a scanning electron micrograph of surface of an activated carbon in Comparative Example.
Figure 5:

As shown in FIG. 1, the method for manufacturing an activated carbon for an electrode of a power storage device of the present invention is characterized in that a block 20 of porous phenolic resin in which consecutive macropores with an average pore size within a range of 3 to 35 µm are formed in a three-dimensional network form is cut into a plate shape, for example, a disk shape, the cut plate-shaped body, for example, the disk, made of a porous phenolic resin is heated in an inert gas atmosphere from room temperature to a range of 700 to 1,000° C., the plate-shaped body, for example, a disk 21 is held in an inert gas atmosphere at the increased temperature, resulting in a carbonization treatment, to obtain a plate-shaped body, for example, disk-shaped carbonized material, the carbonized material is heated in an inert gas atmosphere from room temperature to a range of 800 to 900° C., the carbonized material is held under passing of carbon dioxide at the increased temperature so that the activation yield falls within a range of 40 to 70%, and as a result, the carbonized material is subjected to an activation treatment to obtain a plate-shaped body, for example, disk-shaped activated carbon 22. In FIG. 1, symbols 21a and 22a represent macropores of the disk 21 of a porous phenolic resin and micropores of the activated carbon 22, respectively.

(a) Production of Porous Phenolic Resin

A porous phenolic resin that is a raw material in the manufacturing method and a precursor of an activated carbon electrode is produced, for example, by the following method.

A pore forming agent and a cross-linker are first mixed in an aqueous solution prepared by mixing a phenolic resin and polyvinyl alcohol, and a catalyst for hardening this mixed solution is mixed in the mixed solution. Subsequently, water is mixed in the mixture to obtain a reaction solution, the reaction solution is injected into a block-shaped mold made of a synthetic resin, and heated, resulting in a reaction for a predetermined time. The resulting reaction product is taken from the mold, and washed with water to remove the pore forming agent and the unreacted substance, and the reaction product is then dried. According to this production method, a block of porous phenolic resin in which consecutive macropores with an average pore size within a range of 3 to 35 μm are formed in a three-dimensional network form is obtained. A method for producing a block of phenolic resin described in Patent Document 2 is a method of dispersing a lipophilic compound in a phenolic resin, and adjusting the pore size by a stirring rate, especially during stirring. In the method, a rate gradient is caused in the solution, and therefore, a fine pore size cannot be uniformly adjusted. Further, a method of dispersing an expanding agent in a phenolic resin to cause evaporation and foaming is also described. However, in this method, a fine pore size is unlikely to be formed due to foaming, and the pore size cannot be uniformly adjusted. On the other hand, in the method for producing a block of phenolic resin of the present invention, the pore size of fine communication pores can be uniformly adjusted by mixing a pore forming agent in a phenolic resin and selecting the kind, amount, and temperature of the pore forming agent. Therefore, a block of porous phenolic resin with an average pore size of 3 to 35 μm is obtained.

(b) Cutting of Block

The block of porous phenolic resin is pulled into a column having a diameter of 21 to 22 mm with a drilling machine, and cut into a plate shape, for example, a disk shape, having a thickness of 1 to 3 mm, for example, with a diamond saw. When the plate-shaped body is a disk, the diameter of the disk falls within a range of 21 to 22 mm. The plate-shaped body is not restricted to a disk, and may be a rectangle. The shape, dimension, and thickness of the plate-shaped body are determined according to the application of an activated carbon electrode.

The average pore size of the consecutive macropores formed in a three-dimensional network form is defined within the above range. This is because when the average pore size is less than the lower limit, activation as described below is not sufficiently carried out, and when it is more than the upper limit, the mechanical strength decreases. In a method for measuring the average pore size, a mercury porosimeter is used.

(c) Carbonization Treatment

Subsequently, the cut plate-shaped body made of a porous phenolic resin is placed in a thermal treatment furnace. As the thermal treatment furnace, a horizontal tubular electric furnace is used. The inside of the furnace is made to be an inert gas atmosphere, and the thermal treatment furnace is heated from room temperature to a range of 700 to 1,000° C., and preferably 800 to 900° C., at a temperature increasing rate of 5 to 20° C./min, and held in an inert gas atmosphere at the increased temperature for 0.5 to 2 hours. Thus, a thermal treatment is carried out. After the thermal treatment, the electric furnace is slowly cooled to room temperature. By the thermal treatment under the above-described conditions, the plate-shaped body is subjected to a carbonization treatment to obtain a plate-shaped carbonized material. As an inert gas, a gas of nitrogen, argon, or helium is used. The temperature to be increased for the carbonization treatment is defined within the range. This is because when the temperature is lower than the lower limit, there is a problem in which carbonization is not sufficient, and when it is higher than the upper limit, there is a problem in which activation that is the next step is unlikely to be carried out. The temperature increasing rate for the carbonization treatment is defined within the range. This is because when the temperature increasing rate is lower than the lower limit, there is a problem in which it takes too much time to carry out carbonization, and when it is higher than the upper limit, there is a problem in which carbonization is not sufficient.

(d) Activation Treatment

Further, in a state in which the plate-shaped carbonized material is placed in the thermal treatment furnace, the thermal treatment furnace is heated under an inert gas atmosphere from room temperature to a range of 800 to 900° C. Subsequently, introduction of inert gas is stopped, and carbon dioxide is introduced. The plate-shaped carbonized material is held under passing of carbon dioxide at the increased temperature for 2 to 12 hours, and preferably 6 to 10 hours so that the activation yield falls within a range of 40 to 70%, and preferably 50 to 65%.

Herein, the activation yield is a rate of change of amount of a sample due to the activation treatment, which is represented by the following equation.

$$\text{Activation Yield (\%)} = (\text{Amount of Sample After Activation}/\text{Amount of Sample Before Activation}) \times 100\%$$

The temperature to be increased for the activation treatment of the carbonized material is defined within the above range. This is because when the temperature is lower than the lower limit, the activation is not sufficiently carried out, and when it is higher than the upper limit, there is a problem of extreme decrease in the yield. The activation yield is defined within the above range. This is because when the activation yield is less than the lower limit, the shape of the material may not be maintained by extreme activation, and the productivity is too low, and when it is more than the upper limit, an activated carbon having sufficient specific surface area is not obtained, and the initial capacitance and the endurance are inferior. The activation treatment is carried out in a carbon dioxide atmosphere since micropores are likely to be developed. As an activated gas, steam can be used in addition to carbon dioxide.

In addition to the gas activation method, a chemical activation method can be used as the activation treatment of the present invention. The chemical activation method is a method in which a carbonized material is heated by mixing an agent such as potassium hydroxide, phosphoric acid, and zinc chloride.

(e) Properties and Application of Activated Carbon for Electrode

An activated carbon for an electrode of a power storage device obtained by the gas activation method of the present invention has a specific surface area within a range of 1,500 to 2,300 $m^2/g$, a micropore volume within a range of 0.4 to 1.0 mL/g, and an average micropore width within a range of 0.7 to 1.2 nm, and preferably a specific surface area within a range of 1,600 to 2,000 $m^2/g$, a micropore volume within a range of 0.6 to 0.9 mL/g, and an average micropore width within a range of 0.8 to 1.1 nm. The specific surface are of the activated carbon for an electrode is defined within the above range. This is because when the specific surface area is less than the lower limit, a sufficient capacitance cannot be secured, and when it is more than the upper limit, there is a problem of decrease in the electrode bulk density. The micropore volume is defined within the above range. This is because when the micropore volume is less than the lower limit, a sufficient capacitance cannot be secured, and when it is more than the upper limit, there is a problem of decrease in the electrode bulk density. The average micropore width is defined within the above range. This is because when the average micropore width is less than the lower limit, there is a problem in which an electrolyte ion cannot be adsorbed into the micropore, and when it is more than the upper limit, there is a problem of decrease in the electrode bulk density. The activated carbon for an electrode of a power storage device obtained by the present invention is suitably used for an electric double layer capacitor or a lithium-ion capacitor. According to the present invention, an activated carbon for an electrode of a power storage device suitable for an electric double layer capacitor that has high capacitance during charging and discharging at high current density (2,000 mA/g) and excellent endurance against charging at a high voltage of 3 V or more and a lithium-ion capacitor having excellent endurance against charging at a high voltage of 4 V or more can be manufactured.

EXAMPLES

Hereinafter, Examples of the present invention will be described in detail with Comparative Examples.

Example 1

A phenolic resin (trade name: BRL-1583, available from Showa High Polymer Co., Ltd., solid content: 72%) and PVA were first mixed so that the solid content ratio was 4/1 and the total amount of the solid contents was 30 w/v % relative to a predetermined amount, to prepare an aqueous solution. Subsequently, 12 w/v % of rice starch was added and sufficiently mixed in the aqueous solution, and 5 w/v % of 37% formaldehyde aqueous solution as a cross-linker was added and mixed in the mixture. Further, 7 w/v % of maleic acid as a curing catalyst was added, and water was added to a predetermined amount. The mixture was uniformly mixed to obtain a reaction solution. The obtained reaction solution was injected into a mold, and a reaction was carried out at 60° C. for 20 hours. A resulting reaction product was taken from the mold, and washed with water to remove a starch and an unreacted substance, and the reaction product was dried. According to this production method, a block of porous phenolic resin as a carbon precursor in which consecutive macropores with a porosity of 75% and an average pore size of 7 μm were formed in a three-dimensional network form was obtained. The block of porous phenolic resin was cut with a diamond saw into a disk with a diameter of 22 mm and a thickness of 2 mm. The disk was heated in a nitrogen atmosphere at a temperature increasing rate of 5° C./min from room temperature to 800° C., and held in a nitrogen atmosphere for 1 hour to prepare a carbonized material (hereinafter referred to as MLC). Subsequently, the carbonized material was heated in a nitrogen atmosphere at a temperature increasing rate of 10° C./min from room temperature to 850° C. Thereafter the gas was changed to carbon dioxide, and the carbonized material was held at 850° C. for 8 hours under passing of carbon dioxide, to carry out an activation treatment. Thus, a disk-shaped activated carbon with a diameter of 16 mm and a thickness of about 0.8 mm was obtained.

Example 2

A disk-shaped activated carbon with a diameter of 16 mm and a thickness of 0.8 mm was obtained in the same manner as in Example 1 except that the holding time was changed to 6 hours to cause an activation treatment.

Example 3

A phenolic resin (trade name: BRL-1583, available from Showa High Polymer Co., Ltd., solid content: 72%) and PVA were first mixed so that the solid content ratio was 3/1 and the total amount of the solid contents was 20 w/v % relative to a predetermined amount, to prepare an aqueous solution. Subsequently, 9 w/v % of rice starch was added and sufficiently mixed in the aqueous solution, and 5 w/v % of 37% formaldehyde aqueous solution as a cross-linker was mixed in the mixture. Further, 6 w/v % of maleic acid as a curing catalyst was added, and water was added to a predetermined amount. The mixture was uniformly mixed to obtain a reaction solution. The obtained reaction solution was injected into a mold, and a reaction was carried out at 60° C. for 20 hours. A resulting reaction product was taken from the mold, and washed with water to remove a starch and an unreacted substance, and the reaction product was dried. According to the production method, a disk of porous phenolic resin having consecutive macropores with an average pore size of 9 μm was obtained. Thereafter, a disk-shaped activated carbon with a diameter of 16 mm and a thickness of about 0.8 mm was obtained in the same manner as in Example 1 except that the holding time was changed to 10 hours to cause an activation treatment.

Example 4

A phenolic resin (trade name: BRL-1583, available from Showa High Polymer Co., Ltd., solid content: 72%) and PVA were mixed so that the solid content ratio was 3/1 and the total amount of the solid content was 30 w/v % relative to a predetermined amount, to prepare an aqueous solution. Subsequently, 4 w/v % of rice starch was added to the aqueous solution, the mixture was heated and sufficiently mixed, and 5 w/v % of 37% formaldehyde aqueous solution as a cross-linker was added and mixed in the mixture. Further, 6 w/v % of maleic acid as a curing catalyst was added, and water was added to a predetermined amount. The mixture was uniformly mixed to obtain a reaction solution. The obtained reaction solution was injected into a mold, and a reaction was carried out at 60° C. for 20 hours. A resulting reaction product was taken from the mold, and washed with water to remove a starch and an unreacted substance, and the reaction product was dried. According to the production method, a disk of porous phenolic resin having consecutive macropores with an average pore size of 27 μm was obtained. Thereafter, a disk-shaped activated carbon with a diameter of 16 mm and a thickness of about 0.8 mm was obtained in the same manner as in Example 1 except that the holding time was changed to 10 hours to cause an activation treatment.

Comparative Example 1

A disk-shaped activated carbon with a diameter of 16 mm and a thickness of about 0.8 mm was obtained in the same manner as in Example 1 except that the holding time was changed to 4 hours to cause an activation treatment.

Comparative Example 2

Phenolic resin fibers were carbonized, and then activated by steam to prepare activated carbon fibers (ACF). The activated carbon fibers were pulverized in an agate motar. In addition to the carbon material, acetylene black as a conductive auxiliary agent and a polytetrafluoroethylene (PTFE)-based caking additive as a binder were each prepared. The acetylene black and the PTFE-based caking additive were mixed in 30 mg of the above carbon material. The carbon material, the acetylene black, and the PTFE-based caking additive were mixed so that the mixing ratios were 85% by mass, 10% by mass, and 5% by mass, respectively. The mixture was pressurized at about 6 MPa for 20 minutes with a press machine in an IR tablet-type molding machine, and molded into a disk shape with a diameter of 13 mm and a thickness of about 0.5 mm, to obtain a disk-shaped activated carbon.

Comparative Example 3

A disk-shaped activated carbon with a diameter of 13 mm and a thickness of about 0.5 mm was obtained in the same manner as in Comparative Example 2 except that steam activated carbon of coconut shell activated carbon (YP50F available from KURARAY CHEMICAL CO., LTD.) was used instead of the carbon material in Comparative Example 2. The activated carbon in Comparative Example 3 is widely used as an activated carbon for an electrode of an electric double layer capacitor.

Comparative Test 1 and Evaluation

The physical properties of carbon materials obtained in Examples 1 to 4 and Comparative Examples 1 to 3 were measured. The results are shown below in Table 1.

BET Specific Surface Area

The carbon materials obtained in Examples 1 to 4 and Comparative Examples 1 to 3 were each subjected to measurement of nitrogen adsorption and desorption at 77K, and each BET specific surface area was calculated from a resultant absorption isotherm.

Mesopore Volume, Micropore Volume, and Average Micropore Width

In the carbon materials obtained in Examples 1 to 4 and Comparative Examples 1 to 3, the mesopore volume was determined by a DH method, and the micropore volume and the average micropore width were determined by a DR method. Herein, the micropore has a size of less than 2 nm, and the mesopore has a size within a range of 2 to 50 nm.

Electron Microscope

The carbon materials obtained in Examples 1, 3 and 4 and Comparative Example 3 were each measured with a scanning electron microscope (hereinafter referred to as SEM), to obtain SEM images. FIGS. 2 to 5 represent SEM images of the carbon materials obtained in Examples 1, 3, and 4, and Comparative Example 3. An image photographed at a magnification of 1,000 is represented by (a) and an image photographed at a magnification of 4,000 is represented by (b). In the carbon materials in Examples 1, 3, and 4, an interface is not present since they are different from the activated carbon for a conventional molded electrode, and are not each an assembly of activated carbon particles.

Mercury Porosimeter

Figure 6:
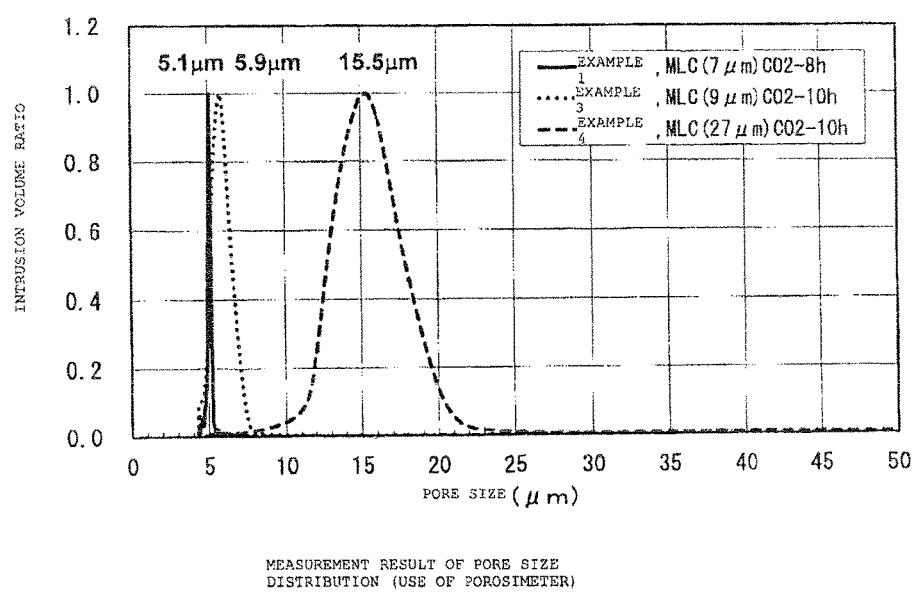
FIG. 6 shows the results of measurement of pore size distribution of the activated carbon in Examples with a mercury porosimeter.
Figure 7:
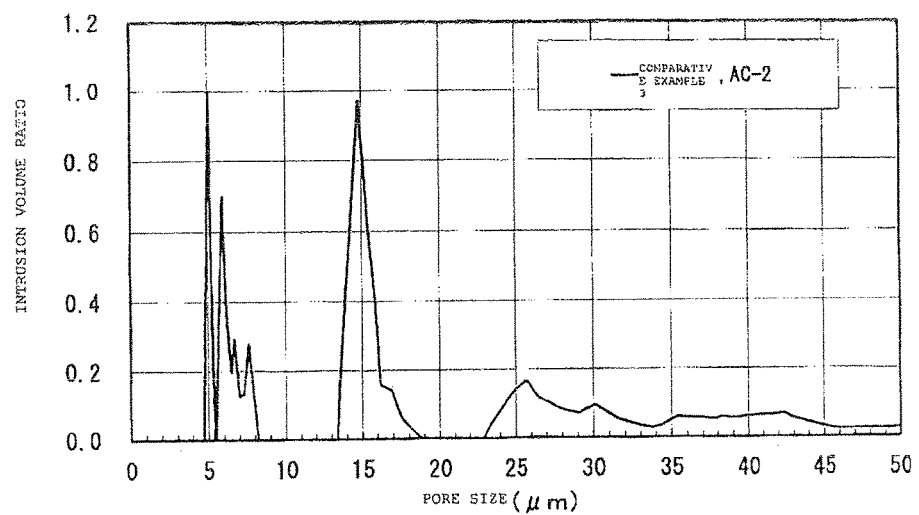
FIG. 7 shows the results of measurement of pore size distribution of the activated carbon in Comparative Example with a mercury porosimeter.

The carbon materials obtained in Examples 1, 3, and 4, and Comparative Example 3 were measured with a mercury porosimeter in the range of 4.3 to 1,000 μm with respect to a pore size. The results of measurement of pore size distribution in the range of up to 50 μm with respect to a pore size are each shown in FIGS. 6 and 7. As confirmed from FIG. 6, macropores are very uniformly distributed in the carbon materials in Examples 1, 3, and 4. This coincides with the SEM images in FIGS. 2 to 5. In FIG. 7, a plurality of distribution peaks are present, it is confirmed that the conventional electrode in Comparative Example 3 is heterogeneous. As apparent from FIG. 6, the pore size of macropores is decreased to about 5 μm in Example 1 in which the average pore size is 7 μm, to about 6 μm in Example 3 in which the average pore size is 9 μm, and to about 16 μm in Example 4 in which the average pore size is 27 μm, by the carbonization treatment and the activation treatment.

Table 1 shows parameters of a pore structure determined by the measurement of nitrogen adsorption and desorption. As seen from Table, a pore structure is developed with an increase in the activation time, and an activated carbon is formed. In the activated carbons in Examples 1, 3, and 4 in which the activation treatment is carried out for 3 and 10 hours, each specific surface area is more than 2,000 $m^2/g$. They are activated carbons in which the micropores are highly developed.

TABLE 1

| | Sample name | Activation time [h] | BET specific surface area [$m^2/g$] | Mesopore volume [mL/g] | Micropore volume [mL/g] | Average micropore width [nm] | Activation yield [%] |
|---|---|---|---|---|---|---|---|
| Example 1 | MLC (7 μm) $CO_2$-8 h | 8 | 2,280 | 0.18 | 0.93 | 1.08 | 51 |
| Example 2 | MLC (7 μm) $CO_2$-6 h | 6 | 1,510 | 0.097 | 0.60 | 0.91 | 63 |
| Example 3 | MLC (9 μm) $CO_2$-10 h | 10 | 2,160 | 0.17 | 0.89 | 1.06 | 51 |
| Example 4 | MLC (27 μm) $CO_2$-10 h | 10 | 2,010 | 0.19 | 0.84 | 1.15 | 51 |

TABLE 1-continued

|  | Sample name | Activation time [h] | BET specific surface area [m²/g] | Mesopore volume [mL/g] | Micropore volume [mL/g] | Average micropore width [nm] | Activation yield [%] |
|---|---|---|---|---|---|---|---|
| Carbonized material in Example 1 | MLC | — | 580 | 0.004 | 0.23 | 0.67 | — |
| Comparative Example 1 | MLC (7 μm) CO2-4 h | 4 | 1,020 | 0.061 | 0.39 | 0.67 | 81 |
| Comparative Example 2 | AC-1 | — | 1,940 | 0.24 | 0.71 | 0.92 | — |
| Comparative Example 3 | AC-2 | — | 1,590 | 0.22 | 0.58 | 0.89 | — |

Comparative Test 2 and Evaluation
(Manufacture of Electrode for Electric Double Layer Capacitor)

An aluminum foil was prepared as a collector. A conductive adhesive coating was applied to the aluminum foil, and the disc-shaped activated carbon obtained in each of Examples 1 to 4 and Comparative Examples 1 to 3 was placed on the coating. By adhesion, the activated carbon and the collector were integrated to manufacture each electrode.

Specifically, HITASOL (available from Hitachi Chemical Co., Ltd., conductive adhesive coating for EDLC) was applied to an etched aluminum foil (available from JAPAN CAPACITOR INDUSTRIAL CO., LTD., collector for EDLC), and the disk-shaped activated carbon obtained in each of Examples 1 to 4 and Comparative Examples 1 to 3 was attached to this foil, to manufacture each electrode.

(Manufacture of Two-Electrode Cell for Electric Double Layer Capacitor)

Figure 8:
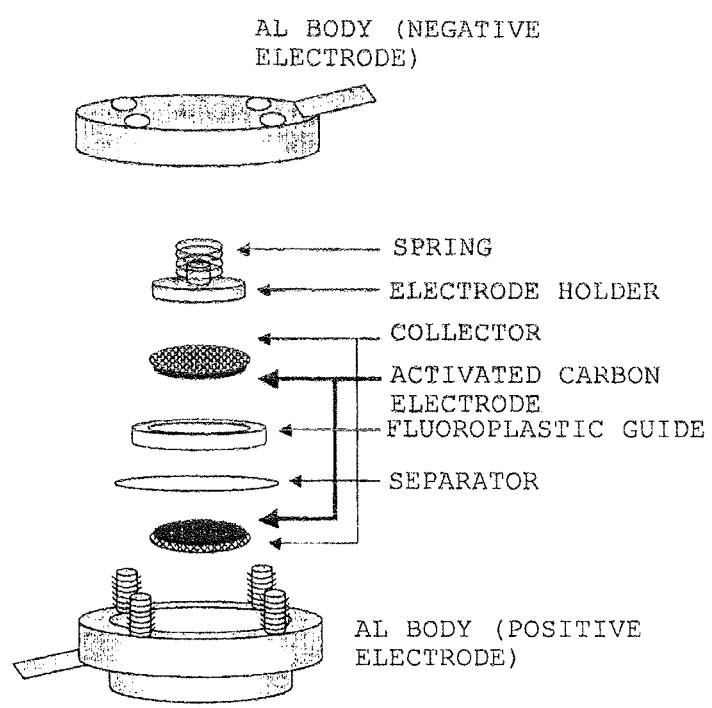
FIG. 8 is a view illustrating a construction of a two-electrode cell for evaluation of an electric double layer capacitor used in Example.

For capacitance measurement and endurance test of an electric double layer capacitor, an aluminum two-electrode cell having a structure shown in FIG. 8 was manufactured using the activated carbon electrode obtained in each of Examples 1 to 4 and Comparative Examples 1 to 3 and used. This two-electrode cell was manufactured as follows. An electrode on the positive side, a separator, a fluoroplastic guide, and an electrode on the negative side in this order were stacked on an aluminum body of a positive electrode having electric wiring, and a space between the electrodes was impregnated with an electrolyte solution. An electrode holder with a spring and an aluminum body on a side of a negative electrode having electric wiring were disposed on a layered collector on a negative electrode side and the collector and the electrode holder were sandwiched between the aluminum body on the positive electrode side and the aluminum body on the negative electrode side. As the electrolyte solution of the electric double layer capacitor, a propylene carbonate solution containing 1.0 M triethylmethylammonium tetrafluoroborate (($C_2H_5$)$_3CH_3NBF_4$) as an electrolyte salt was used. The electrolyte solution is generally used as an organic electrolyte solution for an electric double layer capacitor.

After drying at 200° C. in a thermal vacuum drier for 2 hours, the impregnation with the electrolyte solution was carried out by transferring the layered body to an argon glove box and holding it for 30 minutes.

(Current Density-Dependency Evaluation)

Figure 10:
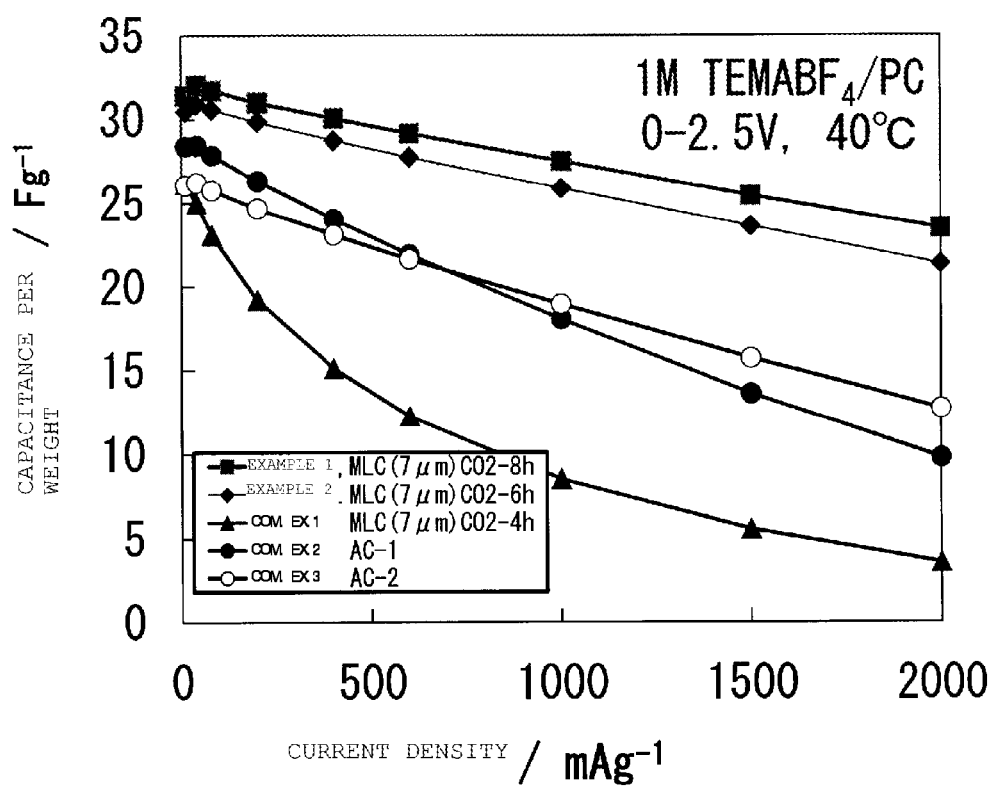
FIG. 10 is a graph illustrating an current density-dependency of capacitance per weight of the activated carbon in Examples and Comparative Examples.
Figure 11:
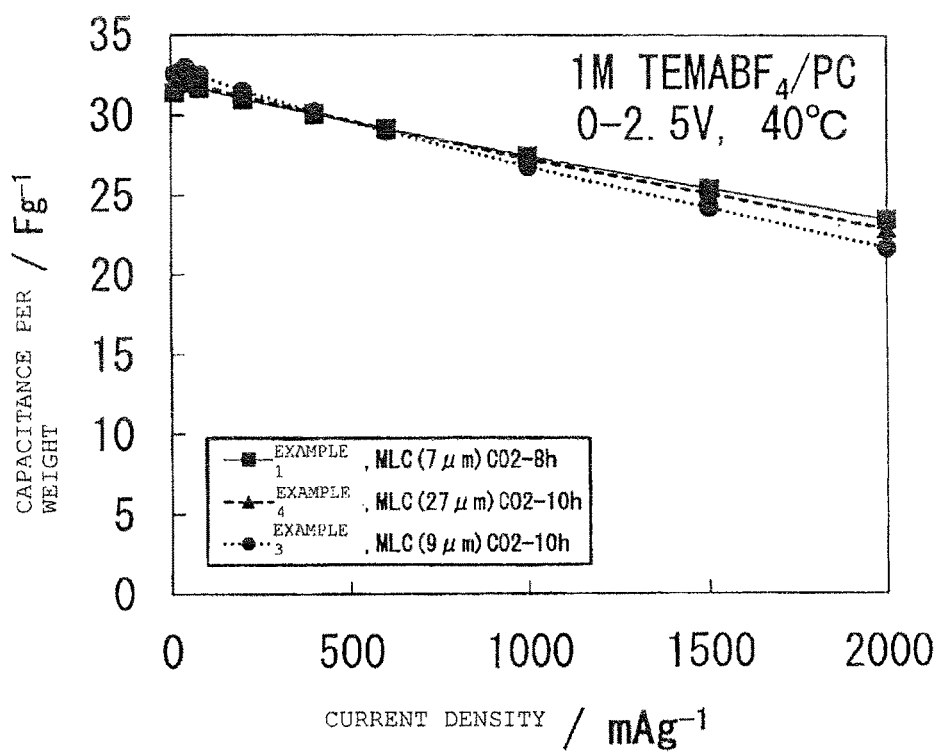
FIG. 11 is a graph illustrating an current density-dependency of capacitance per weight of the activated carbon in Examples.

For current density-dependency evaluation of the electric double layer capacitor, capacitance measurement was carried out by a constant current method, in which charging and discharging were repeated 5 times at each constant current density of 10 mA/g, 40 mA/g, 80 mA/g, 200 mA/g, 400 mA/g, 600 mA/g, 1,000 mA/g, 1,500 mA/g, and 2,000 mA/g, an evaluation voltage of 0 to 2.5 V, and a temperature of 40° C. FIG. 10 shows the current density-dependency of capacitance of an electric double layer capacitor using the disk-shaped activated carbon in each of Examples 1 and 2 and Comparative Examples 1 to 3, and FIG. 11 shows the current density-dependency of capacitance of electric double layer capacitor using the disk-shaped activated carbon in each of Examples 1, 3, and 4.

In Examples 1 to 4, the capacitance slightly decreases even by charge and discharge at high current density as compared with Comparative Examples 2 and 3, and the rate characteristics (charge and discharge responsivity) are excellent. This may be because in Comparative Examples 2 and 3, the contact resistance between the activated carbon particles is high and the internal resistance of the electrode is high, and in Examples 1 to 4, the activated carbon is seamless, there is no contact resistance between the activated carbon particles, and the internal resistance of the electrode is low. In Examples 1 to 4 and Comparative Example 1, the weight per sheet of the electrode is about 30 mg, therefore, there is hardly any different with the activated carbon molding electrode in each of Comparative Examples 2 and 3 with respect to the weight of the electrode. Therefore, an effect due to the difference between the electrode weights may be ignored in comparison of the both electrodes.

(Endurance Test)

Figure 12:
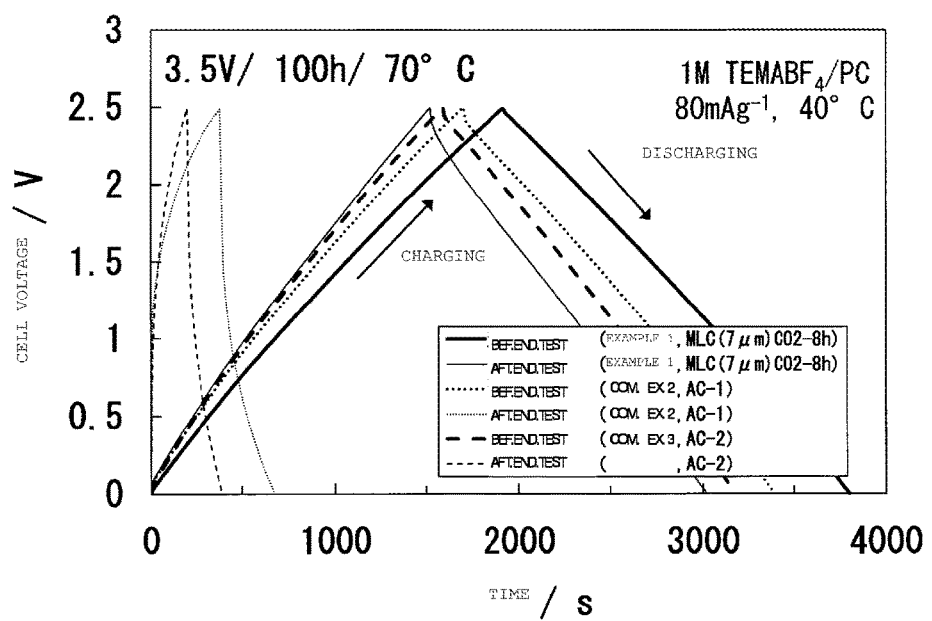
FIG. 12 is a graph illustrating a charge and discharge curve before and after an endurance test of an electric double layer capacitor using the activated carbon in Examples and Comparative Examples.
Figure 13:
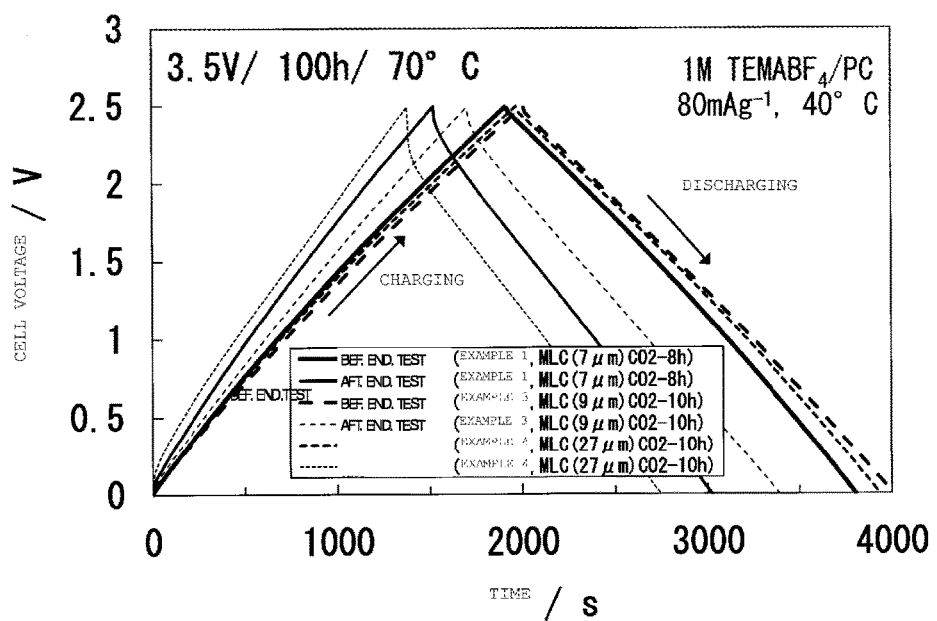
FIG. 13 is a graph illustrating a charge and discharge curve before and after an endurance test of an electric double layer capacitor using the activated carbon in Examples.
Figure 14:
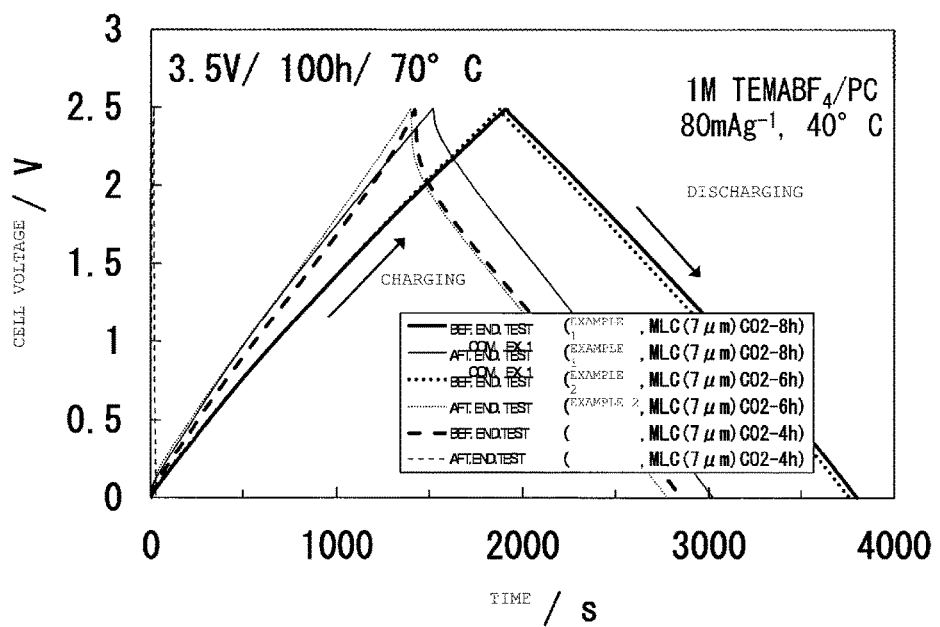
FIG. 14 is a graph illustrating a charge and discharge curve before and after an endurance test of an electric double layer capacitor using the activated carbon in Examples and Comparative Examples.

For evaluation of endurance of the electric double layer capacitor, the capacitance was measured by a constant current method (current density: 80 mA/g, measurement voltage range: 0 to 2.5 V) at 40° C. The capacitance of the fifth cycle was considered as an initial capacitance. After the measurement of the capacitance, the endurance test was carried out by applying a voltage of 3.5 V to a cell at 70° C. for 100 hours. Subsequently, after the endurance test, the temperature was returned to 40° C., and the capacitance was determined by the constant current method (current density: 80 mA/g, measurement voltage range: 0 to 2.5 V). The capacitance of the fifth cycle was considered as a final capacitance. The ratio of capacitances before and after the endurance test (ratio of the final capacitance and the initial capacitance) was considered as a capacitance retention ratio. FIG. 12 shows charge and discharge curves of the electric double layer capacitor using the disk-shaped activated carbon in each of Example 1 and Comparative Examples 2 and 3 before and after the endurance test. FIG. 13 shows charge and discharge curves of the electric double layer capacitor using the disk-shaped activated carbon in each of Examples 1, 3, and 4 before and after the endurance test. FIG. 14 shows charge and discharge curves of the electric double layer capacitor using the disk-shaped activated carbon in each of Examples 1 and 2 and Comparative Example 1 before and after the endurance test. Table 2 shows the initial capacitance and the capacitance retention ratio.

As apparent from FIG. 12, the charge and discharge curves before the endurance test in Example 1 and Comparative Examples 2 and 3 are linear, which is specific to a capacitor. However, in Comparative Examples 2 and 3, the charge and discharge curves after the endurance test are largely distorted as compared with before the endurance test. On the other hand, in Example 1, the gradient of the charge and discharge curve after the endurance test is slightly steep, and the capacitance slightly decreases, but the charge and discharge curve is almost the same as in before the endurance test. As apparent from FIG. 13, in Example 3 in which the initial pore size of the macropores is 9 μm and the pore size after the activation treatment is 6 μm and Example 4 in which the initial pore size of the macropores is 27 μm and the pore size after the activation treatment is 16 μm, the obtained charge and discharge curves are the same as in Example 1 in which the pore size of the macropores after the activation treatment is 5 μm. As apparent from FIG. 14, in Comparative Example 1, the charge and discharge curve after the endurance test is largely distorted as compared with the charge and discharge curve before the endurance test.

As apparent from Table 2, the endurance against charging at a high voltage of 3.5 V in Examples 1 to 4 is very excellent as compared with Comparative Examples 1 to 3. This may be because in the phenolic resin-based activated carbons of Examples 1 to 4, breakdown of an electrical network between the particles due to electrolysis caused by charging at high voltage, as seen in the conventional electrode in Comparative Examples 2 and 3, does not occur due to absence of contact interface between the activated carbons.

carbon electrode obtained in each of Example 1 and Comparative Example 3. This two-electrode cell was manufactured as follows. An electrode on the positive side, a separator (for a lithium-ion battery), a polypropylene guide, and an electrode on the negative side (graphite-coating copper foil) in this order were stacked on an aluminum body of a positive electrode having electric wiring, and a space between the electrodes was impregnated with an electrolyte solution. An electrode holder with a spring and a stainless body on a side of a negative electrode having electric wiring were disposed on a layered collector on a negative electrode side and the collector and the electrode holder were sandwiched between the aluminum body on the positive electrode side and the stainless body on the negative electrode side. Lithium ions were doped into the graphite-coating copper foil of the negative electrode in advance. As the electrolyte solution, an ethylene carbonate (EC)-ethylmethyl carbonate (EMC) mixed solution containing 1.0 M $LiPF_6$ was used. The electrolyte solution is generally used as an organic electrolyte solution for a lithium-ion capacitor. The stainless body was used for a base of the cell on the negative electrode side since aluminum was reacted with a carbon negative electrode into which lithium was doped. Further, the polypropylene guide was used as an electrode guide since the carbon negative electrode into which lithium is doped is highly reductive and is reacted with a fluoroplastic.

(Ragone Plot Measurement)

Figure 15:
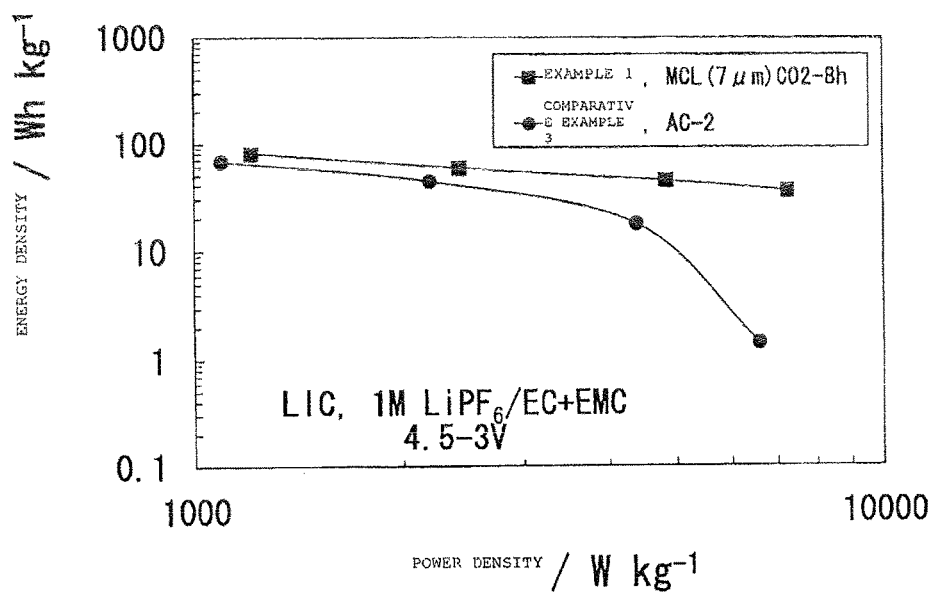
FIG. 15 is a graph illustrating ragone plots of a lithium-ion capacitor using the activated carbon in Examples and Comparative Examples.

The constructed cell for a lithium-ion capacitor was charged to 4.3 V at a constant current (1.2 mA) and 35° C., and discharged to 3 V at constant power, and thus ragone plot measurement was carried out. FIG. 15 shows ragone plot of the lithium-ion capacitor (LIC) using the disk-shaped activated carbon in each of Example 1 and Comparative Example 3.

As seen from FIG. 15, the energy density of the lithium-ion capacitor using the activated carbon in Example 1 for a

TABLE 2

| Sample name | | Activation time [h] | BET specific surface area [$m^2/g$] | Activation yield [%] | Initial capacitance [F/g] | Capacitance retention ratio after endurance test [%] |
|---|---|---|---|---|---|---|
| Example 1 | MLC (7 μm) CO2-8 h | 8 | 2,280 | 51 | 30 | 80 |
| Example 2 | MLC (7 μm) CO2-6 h | 6 | 1,510 | 63 | 30 | 74 |
| Example 3 | MLC (9 μm) CO2-10 h | 10 | 2,160 | 51 | 32 | 84 |
| Example 4 | MLC (27 μm) CO2-10 h | 10 | 2,010 | 51 | 31 | 70 |
| Comparative Example 1 | MLC (7 μm) CO2-4 h | 4 | 1,020 | 81 | 23 | 1 |
| Comparative Example 2 | AC-1 | — | 1,940 | — | 27 | 17 |
| Comparative Example 3 | AC-2 | — | 1,590 | — | 25 | 12 |

Comparative Test 3 and Evaluation (Manufacture of Electrode for Lithium-Ion Capacitor)

An electrode used for a cell for a lithium-ion capacitor was manufactured using the disc-shaped activated carbon obtained in each of Example 1 and Comparative Example 3 in the same manner as in Comparative Example 2.

(Manufacture of Cell for Lithium-Ion Capacitor)

Figure 9:
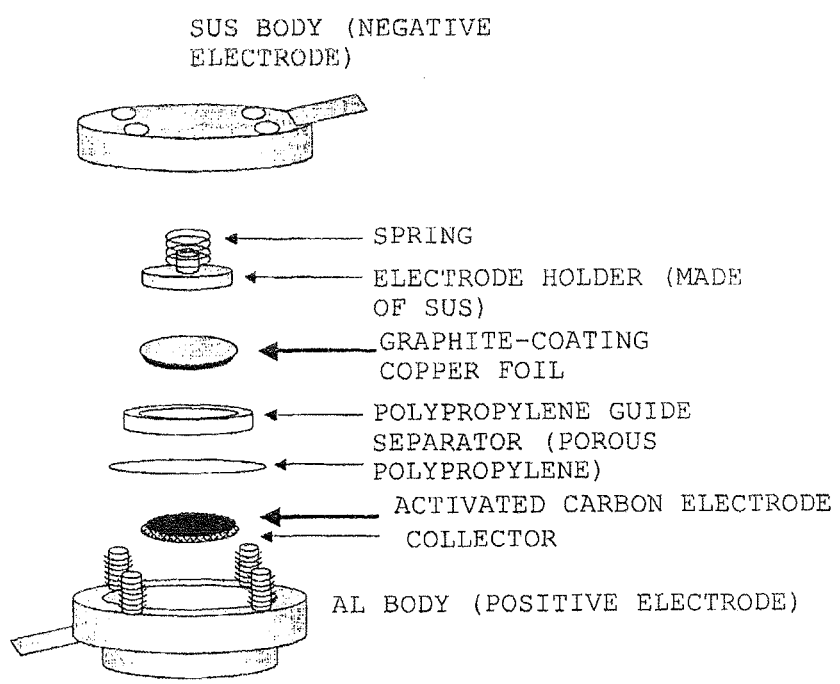
FIG. 9 is a view illustrating a construction of a two-electrode cell for evaluation of a lithium-ion capacitor used in Example.

For capacitance measurement and endurance test of a lithium-ion capacitor, a two-electrode cell having a structure shown in FIG. 9 was manufactured using the activated positive electrode does not decrease even at high power density, as compared with the lithium-ion capacitor using the conventional electrode in Comparative Example 3 for a positive electrode. This may be because there is no contact resistance between the activated carbon particles and the internal resistance of the electrode is low, like the result of the electric double layer capacitor.

(High Voltage Endurance Test)

Figure 16:
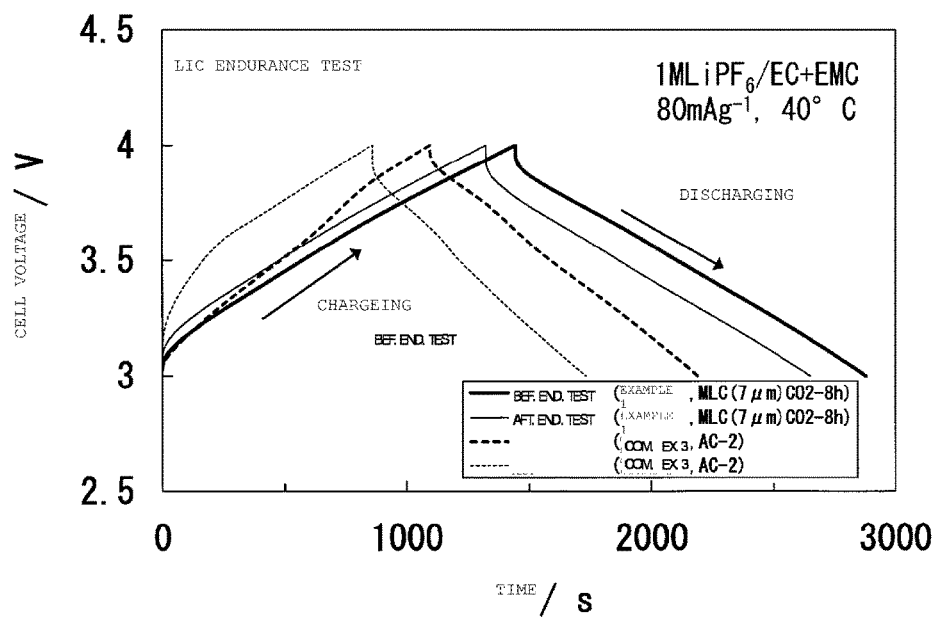
FIG. 16 is a graph illustrating a charge and discharge curve before and after an endurance test of a lithium-ion capacitor using the activated carbon in Examples and Comparative Examples.
Figure 17:
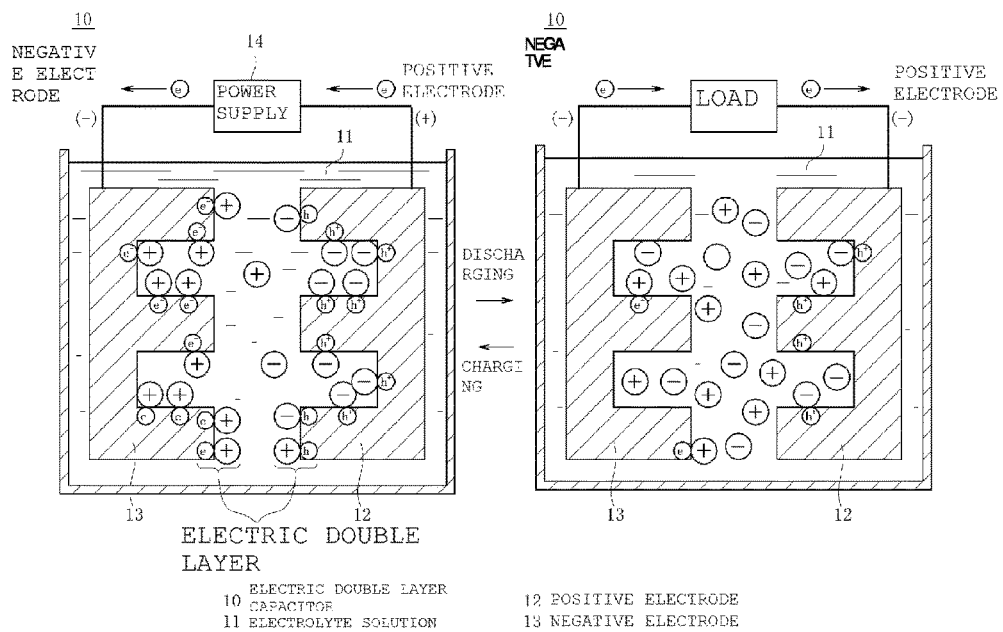
FIG. 17 is a view of principle illustrating the charging and discharging of a general electric double layer capacitor.
Figure 18:
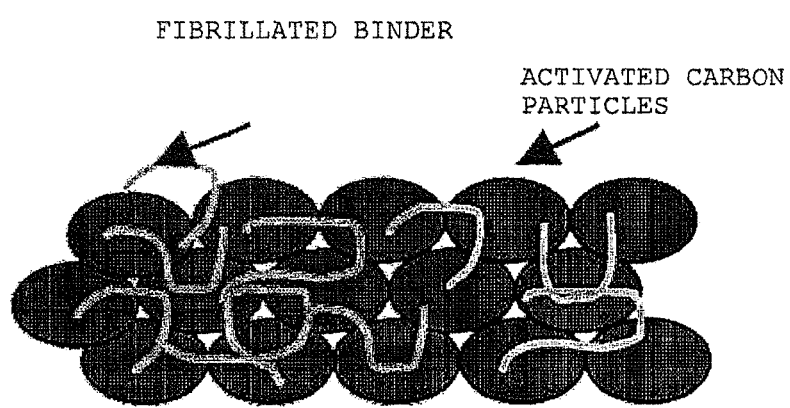
FIG. 18 is a schematic view of conventional activated carbon for an electrode.

For evaluation of endurance of the lithium-ion capacitor, the capacitance was measured by a constant current method (current density: 80 mA/g, measurement voltage range: 3 to 4 V) at 40° C. The capacitance of the fifth cycle was considered as an initial capacitance. After the measurement of the capacitance, the endurance test was carried out by applying a voltage of 4.5 V to a cell at 40° C. for 100 hours. Subsequently, after the endurance test, the capacitance was determined by the constant current method (current density: 80 mA/g, measurement voltage range: 3 to 4 V). The capacitance of the fifth cycle was considered as a final capacitance. The ratio of capacitances before and after the endurance test (ratio of the final capacitance and the initial capacitance) was considered as a capacitance retention ratio. FIG. 16 shows charge and discharge curves of the lithium-ion capacitor using the disk-shaped activated carbon in each of Example 1 and Comparative Example 3 before and after the endurance test through the constant current method.

As apparent from FIG. 16, in both of the lithium-ion capacitor using the activated carbon in Example 1 for a positive electrode and the lithium-ion capacitor using the conventional electrode for a positive electrode, the charge and discharge curves are linear, which is specific to a capacitor. In Example 1, the charge and discharge curve after the endurance test was almost the same as that before the endurance test. However, in Comparative Example 3, the charge and discharge curve after the endurance test largely changes, and a time required for discharging decreases. This means that the capacitance decreases due to the endurance test.

Table 3 shows results summarizing the capacitance (initial capacitance) before the endurance test and the capacitance retention ratio after the endurance test from the above charge and discharge curves. In Example 1, it is clear that the endurance against charging at high voltage is excellent as compared with Comparative Example 3.

TABLE 3

| | Sample name | Activation time [h] | BET specific surface area [m²/g] | Activation yield [%] | Initial capacitance [F/g] | Capacitance retention ratio after endurance test [%] |
|---|---|---|---|---|---|---|
| Example 1 | MLC (7 μm) CO2-8 h | 8 | 2280 | 51 | 86 | 93 |
| Comparative Example 3 | AC-2 | — | 1590 | — | 65 | 80 |

INDUSTRIAL APPLICABILITY

The activated carbon for an electrode of a power storage device manufactured by the method of the present invention is used for an electrode of a power storage device such as an electric double layer capacitor and a lithium-ion capacitor.

EXPLANATION OF THE REFERENCE NUMERALS

10 Electric double layer capacitor
11 Electrolyte solution
12 Positive electrode
13 Negative electrode
14 Power source
20 Block of porous phenolic resin
21 Disk of porous phenolic resin
22 Disk-shaped activated carbon

The invention claimed is:

1. An activated carbon for an electrode of a power storage device having
   uniform consecutive macropores and a pore size distribution centered within a range of 1.5 to 25 μm,
   a specific surface area within a range of 1,500 to 2,300 m²/g,
   a micropore volume within a range of 0.6 to 0.93 mL/g, and
   an average micropore width within a range of 0.7 to 1.2 nm.

2. A method for manufacturing an activated carbon for an electrode of a power storage device comprising:
   adding and mixing a pore forming agent and a cross-linker in an aqueous solution prepared by mixing a phenolic resin and polyvinyl alcohol,
   adding and mixing a catalyst for curing this mixed solution in the mixed solution, adding and mixing water in the mixture to obtain a reaction solution, injecting the reaction solution into a block-shaped mold made of a synthetic resin, heating the reaction solution to cause a reaction for a predetermined time, taking the resulting reaction product from the mold, washing the reaction product with water to remove the pore forming agent and the unreacted substance, drying the reaction product, to obtain a block of porous phenolic resin in which uniform consecutive macropores with an average pore size within a range of 3 to 35 μm are formed in a three-dimensional network form,
   cutting the block of the porous phenolic resin into a plate shape,
   heating the cut plate-shaped body in an inert gas atmosphere from room temperature to a range of 800 to 900° C., and holding the plate-shaped body in the inert gas atmosphere at the increased temperature, resulting in a carbonization treatment, to obtain a plate-shaped carbonized material, and
   carrying out an activation treatment of the plate-shaped carbonized material so that the activation yield falls within a range of 40 to 70% and a micropore volume within a range of 0.6 to 0.93 mL/g, to obtain a plate-shaped activated carbon.

3. The method for manufacturing an activated carbon for an electrode of a power storage device according to claim 2, wherein the activation treatment is carried out by
   heating the plate-shaped carbonized material in an inert gas atmosphere from room temperature to a range of 800 to 900° C., and
   holding the material under passing of carbon dioxide at the increased temperature.

4. An electric double layer capacitor using the activated carbon according to claim 1 for an electrode.

5. A lithium-ion capacitor using the activated carbon according to claim 1 for an electrode.

6. An electric double layer capacitor using the activated carbon manufactured by the method according to claim 2 for an electrode.

7. A lithium-ion capacitor using the activated carbon manufactured by the method according to claim 2 for an electrode.

* * * * *